US008451250B2

(12) United States Patent
Hsieh et al.

(10) Patent No.: US 8,451,250 B2
(45) Date of Patent: May 28, 2013

(54) CAPACITIVE TOUCH DEVICE AND METHOD OF DRIVING SAME

(75) Inventors: Ming-Lun Hsieh, Hsinchu (TW); Chun-Ku Kuo, Hsinchu (TW); Po-Yuan Liu, Hsinchu (TW)

(73) Assignee: Au Optronics Corporation, Hsinchu (TW)

(*) Notice: Subject to any disclaimer, the term of this patent is extended or adjusted under 35 U.S.C. 154(b) by 354 days.

(21) Appl. No.: 12/841,802

(22) Filed: Jul. 22, 2010

(65) Prior Publication Data

US 2012/0019474 A1 Jan. 26, 2012

(51) Int. Cl.
*G06F 3/045* (2006.01)
*G06F 3/041* (2006.01)

(52) U.S. Cl.
USPC .......................................... 345/174; 345/173

(58) Field of Classification Search
USPC .......................................... 345/174
See application file for complete search history.

(56) References Cited

U.S. PATENT DOCUMENTS

| 5,418,551 A * | 5/1995 | Ise ................................. 345/174 |
| 5,861,583 A * | 1/1999 | Schediwy et al. ......... 178/18.06 |
| 7,202,859 B1 * | 4/2007 | Speck et al. .................. 345/174 |
| 8,144,125 B2 * | 3/2012 | Peng et al. .................... 345/173 |
| 8,194,047 B2 * | 6/2012 | Hsieh et al. ................... 345/173 |
| 2007/0229468 A1 * | 10/2007 | Peng et al. .................... 345/173 |
| 2008/0158183 A1 | 7/2008 | Hotelling et al. |
| 2010/0060608 A1 * | 3/2010 | Yousefpor .................... 345/174 |
| 2011/0115718 A1 * | 5/2011 | Hsieh et al. ................... 345/173 |

* cited by examiner

*Primary Examiner* — Alexander S Beck
*Assistant Examiner* — Mihir Rayan
(74) *Attorney, Agent, or Firm* — Morris Manning & Martin LLP; Tim Tingkang Xia, Esq.

(57) ABSTRACT

The present invention relates to a capacitive touch panel. In one embodiment, the capacitive touch panel includes a plurality of driving electrodes and a plurality of sensing electrodes spatially arranged in a matrix, and a driver electrically coupled to the touch sensor matrix and configured to generate a driving signal to synchronically drive one or more driving electrodes and the sensing electrodes, such that at least one sensing electrode is not driven by the driving signal. The remaining driving electrodes are grounded. The not-driven sensing electrodes sense and transmit a sensing signal of a touch.

16 Claims, 12 Drawing Sheets

CAPACITIVE TOUCH DEVICE AND
METHOD OF DRIVING SAME

FIELD OF THE INVENTION

The present invention relates generally to a touch panel, and more particularly to a capacitive touch panel configured such that one or more driving electrodes and the sensing electrodes on which no touch occurs are synchronically driven by a sync driving signal each time, while the remaining driving electrodes are grounded, thereby reducing the RC loading of driving electrodes and/or sensing electrodes.

BACKGROUND OF THE INVENTION

Touch sensing technology capable of providing a natural interface between an electronic system and user has found widespread applications in a variety of fields, for example, in mobile phones, personal digital assistants (PDAs), automatic teller machines (ATMs), game machines, medical devices, liquid crystal display (LCD) devices, plasma display panel (PDP) devices, computing devices, and the like, where a user may input desired information and/or operate the electronic system through a touch sensing device associated with the electronic system. A touch sensing device typically includes a controller, a sensing circuit having a plurality of touch sensors and a network of control lines electrically connecting the plurality of touch sensors to the controller, and a touch panel associated with the plurality of touch sensors.

There are different types of touch sensing devices available for detection of a touch location. One is a resistive-type touch sensing device that includes two layers of transparent conductive material, such as a transparent conductive oxide, separated by a gap. When touched with sufficient force, one of the conductive layers flexes to make contact with the other conductive layer. The location of the contact point is detectable by a controller that senses the change in resistance at the contact point. In response, the controller performs a function, if any, associated with the contact point.

Another one is a capacitive-type touch sensing device. The capacitive-type touch sensing device can be classified into two types: an analog capacitive sensing device, which uses a contiguous resistive layer, and a mutual-type projected capacitive sensing device, which uses patterned conductive layers (electrodes).

In a projected capacitive touch device, the touch sensor employs a series of patterned electrodes that are driven with a signal from a controller. Similarly, a location of the contact point can be derived from currents flowing through one or more corresponding electrodes toward the touch point responsive to the touch with sensing the capacitance induced by a user's finger. A finger touch to the sensor provides a capacitive couple from the conductive layer to the body. The location of the contact point is detectable by a controller that measures a change in a capacitively coupled electrical signal at the touch location. Accordingly, the controller performs a function, if any, associated with the touch location.

FIG. 12 shows a conventional capacitive touch device 10 having five (5) driving electrodes X1-X5, and ten (10) sensing electrodes Y1-Y10 arranged in a 5×10 matrix. Traditionally, a driving signal 16 is applied to a single driving electrode, for example, X2. The driving signal 16 is, through a mutual capacitance coupling, transmitted to a sensing electrode, for example, Y6. Meanwhile, the other driving electrodes, X1 and X3-X5 and the other sensing electrodes Y1-Y5 and Y7-Y10 are grounded. For such a driving method, a lot of capacitance is generated between the driving electrode (X2) and all the sensing electrodes (Y1-Y10), which is indicated by Cm, and between the driving electrode (X2) and its neighboring driving electrodes X1 and X3, which is indicated by Cd. For a large sized touch panel, the capacitance causes significant increase of the RC loading between electrodes, thereby resulting in deformation of the signal output. As shown in FIG. 12, the driving signals 18 and the sensing signals 17 of sensing electrodes in distal areas are substantially deformed, comparing to a driving signal 16 applied to a driving electrode, due to the RC loading of the driving electrodes X2 and/or sensing electrodes Y1-Y10. The larger the touch panel is, the worse the deformation of the sensing signals is. The deformation of the sensing signals may result in poor performance of the touch panel.

Therefore, a heretofore unaddressed need exists in the art to address the aforementioned deficiencies and inadequacies.

SUMMARY OF THE INVENTION

The present invention, in one aspect, relates to a capacitive touch panel. In one embodiment, the capacitive touch panel includes a plurality of driving electrodes, $\{X_n\}$, n=1, 2, ..., N, spatially arranged along a row direction, and a plurality of sensing electrodes, $\{Y_m\}$, m=1, 2, ..., M, spatially arranged crossing over the plurality of driving electrodes $\{X_n\}$ along a column direction perpendicular to the row direction such that the plurality of driving electrodes $\{X_n\}$ and the plurality of sensing electrodes $\{Y_m\}$ define a touch sensor matrix having N rows and M columns, each of N and M being a positive integer. The capacitive touch panel also includes a driver electrically coupled to the touch sensor matrix and configured to generate a driving signal to synchronically drive one of the plurality of driving electrodes $\{X_n\}$ and (M-j) sensing electrodes of the plurality of sensing electrodes $\{Y_m\}$, wherein j=1, 2, 3, ..., or M-1, such that at least one sensing electrode is not driven by the driving signal, and wherein the remaining driving electrodes of the plurality of driving electrodes $\{X_n\}$ are grounded.

The driving signal is sequentially applied to each of the remaining driving electrodes of the plurality of driving electrodes $\{X_n\}$. The at least one sensing electrode transmits a sensing signal of a touch.

In one embodiment, each of the plurality of sensing electrodes and the plurality of driving electrodes are electrically insulated from one another.

In another aspect, the present invention relates to a method of driving a capacitive touch panel comprising a plurality of driving electrodes, $\{X_n\}$, n=1, 2, ..., N, spatially arranged along a row direction, and a plurality of sensing electrodes, $\{Y_m\}$, m=1, 2, ..., M, spatially arranged crossing over the plurality of driving electrodes $\{X_n\}$ along a column direction perpendicular to the row direction such that the plurality of driving electrodes $\{X_n\}$ and the plurality of sensing electrodes $\{Y_m\}$ define a touch sensor matrix having N rows and M columns, each of N and M being a positive integer.

In one embodiment, the method includes the steps of synchronically driving one of the plurality of driving electrodes $\{X_n\}$ and (M-j) sensing electrodes of the plurality of sensing electrodes $\{Y_m\}$ with a driving signal, wherein j=1, 2, 3, ..., or M-1, such that at least one sensing electrode is not driven by the driving signal, and grounding the remaining driving electrodes of the plurality of driving electrodes $\{X_n\}$.

The method further includes the step of sequentially applying the driving signal to each of the remaining driving electrodes of the plurality of driving electrodes $\{X_n\}$.

The method also includes the step of detecting a sensing signal of a touch transmitted from the at least one sensing electrode.

In yet another aspect, the present invention relates to a capacitive touch panel. In one embodiment, the capacitive touch panel has a plurality of driving electrodes, $\{X_n\}$, n=1, 2, ..., N, spatially arranged along a row direction, a plurality of sensing electrodes, $\{Y_m\}$, m=1, 2, ..., M, spatially arranged crossing over the plurality of driving electrodes $\{X_n\}$ along a column direction perpendicular to the row direction such that the plurality of driving electrodes $\{X_n\}$ and the plurality of sensing electrodes $\{Y_m\}$ define a touch sensor matrix having N rows and M columns, each of N and M being a positive integer, and a driver electrically coupled to the touch sensor matrix and configured to generate a driving signal to synchronically drive a group of driving electrodes of the plurality of driving electrodes $\{X_n\}$ and (M-j) sensing electrodes of the plurality of sensing electrodes $\{Y_m\}$, wherein j=1, 2, 3, ..., or M-1, such that at least one sensing electrode is not driven by the driving signal, and wherein the remaining driving electrodes of the plurality of driving electrodes $\{X_n\}$ are grounded.

In one embodiment, the group of the plurality of driving electrodes $\{X_n\}$ has $N_E$ driving electrodes, wherein $N_E$ is an integer that is greater than one and less than N. The plurality of driving electrodes $\{X_n\}$ has $N_G$ groups, wherein $N_G$=(N-$N_E$+1).

The driving signal is sequentially applied to each group of the plurality of driving electrodes $\{X_n\}$ to drive them synchronically. The at least one sensing electrode transmits a sensing signal of a touch.

In one embodiment, each of the plurality of sensing electrodes and the plurality of driving electrodes are electrically insulated from one another.

In a further aspect, the present invention relates to a method of driving a capacitive touch panel comprising a plurality of driving electrodes, $\{X_n\}$, n=1, 2, ..., N, spatially arranged along a row direction, and a plurality of sensing electrodes, $\{Y_m\}$, m=1, 2, ..., M, spatially arranged crossing over the plurality of driving electrodes $\{X_n\}$ along a column direction perpendicular to the row direction such that the plurality of driving electrodes $\{X_n\}$ and the plurality of sensing electrodes $\{Y_m\}$ define a touch sensor matrix having N rows and M columns, each of N and M being a positive integer.

In one embodiment, the method includes the steps of synchronically driving a group of driving electrodes of the plurality of driving electrodes $\{X_n\}$ and (M-j) sensing electrodes of the plurality of sensing electrodes $\{Y_m\}$ with a driving signal, wherein j=1, 2, 3, ..., or M-1, such that at least one sensing electrode is not driven by the driving signal, and grounding the remaining driving electrodes of the plurality of driving electrodes $\{X_n\}$.

In one embodiment, the method further includes the step of sequentially applying the driving signal to each group of the plurality of driving electrodes $\{X_n\}$ to drive them synchronically. The method may also include the step of detecting a sensing signal of a touch transmitted from the at least one sensing electrode.

In one embodiment, the group of the plurality of driving electrodes $\{X_n\}$ has $N_E$ driving electrodes, wherein $N_E$ is an integer that is greater than one and less than N. The plurality of driving electrodes $\{X_n\}$ has $N_G$ groups, wherein $N_G$=(N-$N_E$+1).

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION OF THE INVENTION

Figure 1:
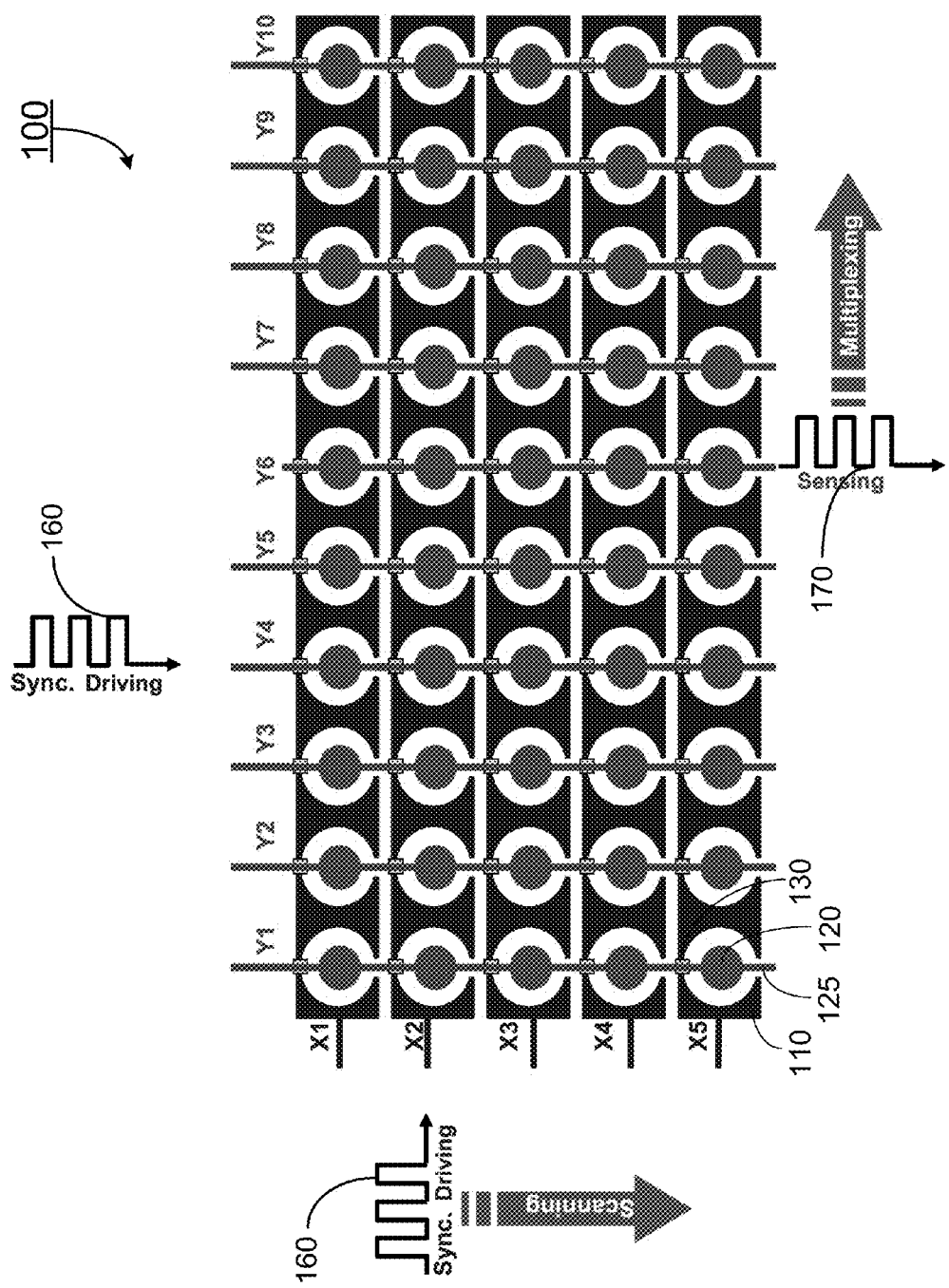
FIG. 1 shows schematically a structural layout of a capacitive touch panel according to one embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. The use of examples anywhere in this specification, including examples of any terms discussed herein, is illustrative only, and in no way limits the scope and meaning of the invention or of any exemplified term. Likewise, the invention is not limited to various embodiments given in this specification.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising," "including," "having," "containing," "involving," and the like are to be understood to be open-ended, i.e., to mean including but not limited to.

The description will be made as to the embodiments of the present invention in conjunction with the accompanying drawings in FIGS. 1-11. In accordance with the purposes of this invention, as embodied and broadly described herein, this invention, in one aspect, relates to a capacitive touch panel that can reduce substantially RC loading of driving electrodes and sensing electrodes.

Figure 2:
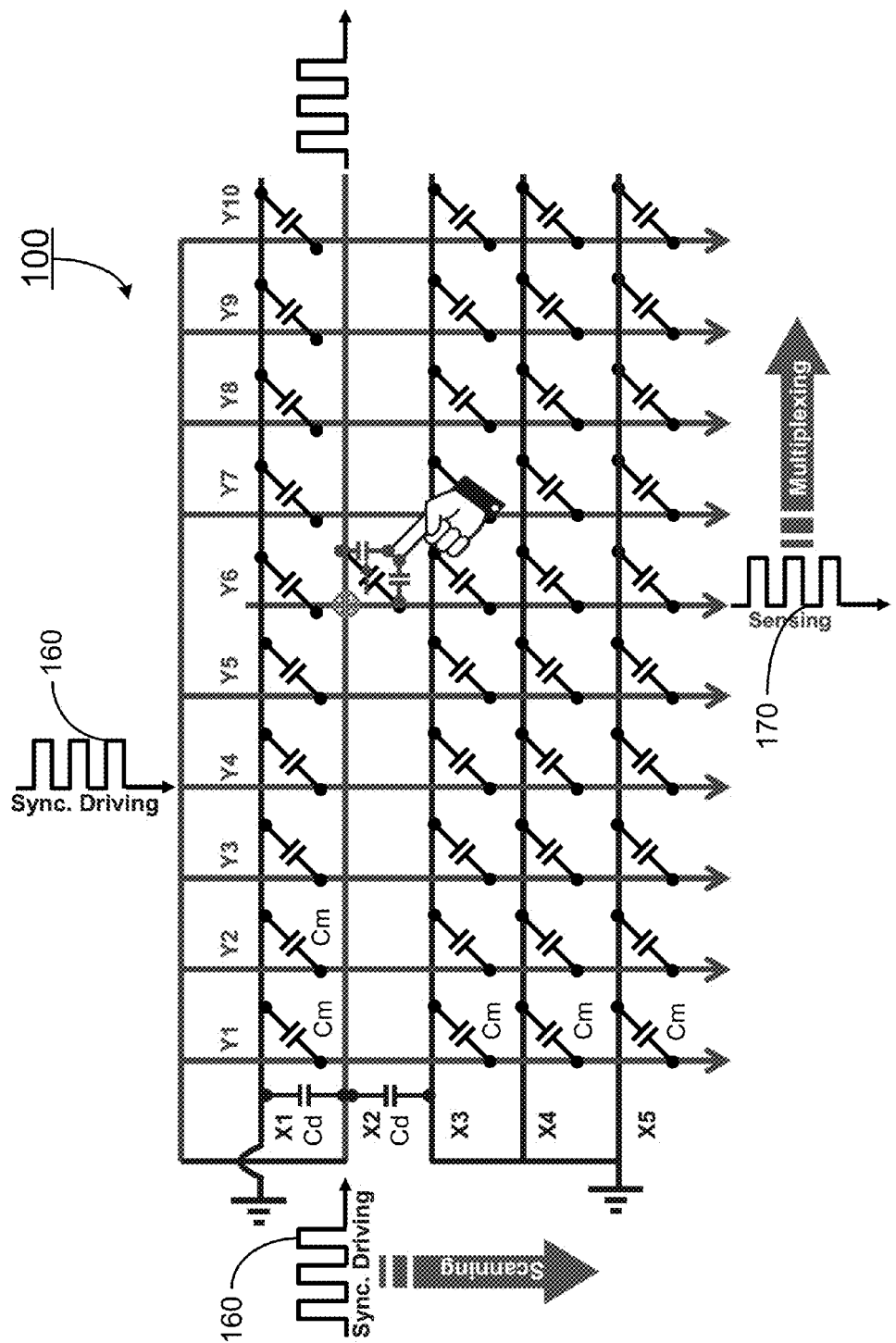
FIG. 2 shows schematically an effective circuit diagram of the capacitive touch panel shown in FIG. 1.

Referring to FIGS. 1 and 2, a capacitive touch panel 100 is shown according to one embodiment of the present invention. The capacitive touch panel 100 includes a plurality of driving electrodes, for example, X1, X2, . . . , X5, spatially arranged along a row direction, and a plurality of sensing electrodes, for example, Y1, Y2, . . . , Y10, spatially arranged crossing over the plurality of driving electrodes X1, X2, . . . , X5 along a column direction perpendicular to the row direction. As such, the plurality of driving electrodes X1, X2, . . . , X5 and the plurality of sensing electrodes Y1, Y2, . . . , Y10 define a touch sensor matrix having five (N=5) rows and ten (M=10) columns. Other numbers of the driving electrodes and the sensing electrodes can also be utilized to practice the present invention.

In the exemplary embodiment, each driving electrode X1, X2, . . . , or X5 (electrode row) includes an electrode strip 110, and each sensing electrode Y1, Y2, . . . , or Y10 (electrode column) includes a number of touch sensors (electrodes) 120 electrically connected by a signal line 125 and associated with the plurality of driving electrode strips 110. In this embodiment shown in FIG. 1, each touch sensor 120 is surrounded by a corresponding driving electrode strip 110. Each touch sensor 120 and the corresponding electrode strip 110 are electrically insulated from one another by an insulation layer/pad 130 and define a sensing capacitor there between. The capacitance of the sensing capacitor varies with a touch.

In practice, the capacitive touch panel 100 also includes a driver or controller (not shown) electrically coupled to the touch sensor matrix. According to the embodiment of the present invention shown in FIGS. 1 and 2, the driver is configured to generate a sync driving signal 160 to synchronically drive one of the plurality of driving electrodes, for example, X2, and some sensing electrodes of the plurality of sensing electrodes, for example, Y1-Y5 and Y7-Y10. Meanwhile, the remaining driving electrodes of the plurality of driving electrodes, for example, X1 and X3-X5, are grounded. In the case, one sensing electrode, Y6, for sensing a touch, is not driven by the sync driving signal 160.

For such a driving configuration, the capacitance Cm between the driving electrode X2 and the driven sensing electrodes Y1-Y5 and Y7-Y10 disappear, because of the synchronic driving. Accordingly, the capacitance associated with the driving electrode X2 is significantly reduced, particularly for a large sized touch panel. In this configuration, the sync driving signal 160 is transmitted through the driving electrode X2 and the driven sensing electrodes Y1-Y5 and Y7-Y10, and a touch sensing signal 170 is transmitted through the not-driven sensing electrode Y6. The location of the contact point is detectable by a controller that measures a change in a touch sensing signal 170 at the touch location.

Further, the sync driving signal 160 is sequentially applied to the plurality of driving electrodes X1-X5 one by one. In other words, the plurality of driving electrodes X1-X5 is dynamically driven by the driving sync signal 160 in a way of scanning at a pre-determined frequency. Whenever one driving electrode is driven by the sync driving signal 160, some sensing electrodes are also synchronically driven by the driving signal 160, and meanwhile, the remaining driving electrodes are grounded. The not-driven sensing electrodes are used to sense a touch and generate a sensing signal 170 responsively.

Figure 3:
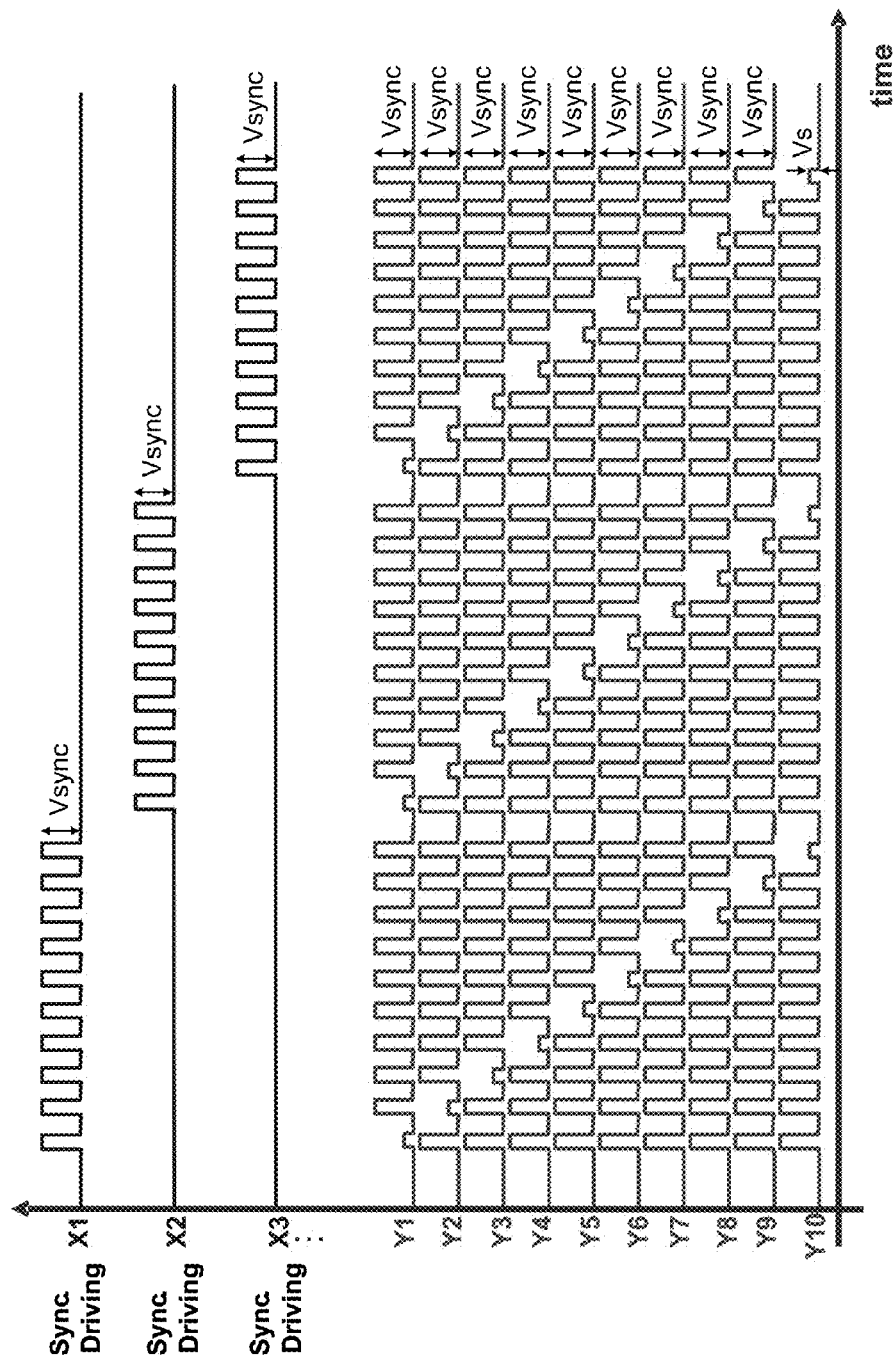
FIG. 3 shows schematically sync driving and sensing signals of the capacitive touch panel shown in FIGS. 1 and 2.

FIG. 3 shows schematically the sync driving signal Vsync and the sensing signal Vs for the capacitive touch panel shown in FIGS. 1 and 2. The sync driving signal Vsync is sequentially applied to the driving electrodes X1, X2, X3, X4 and X5.

Figure 4:
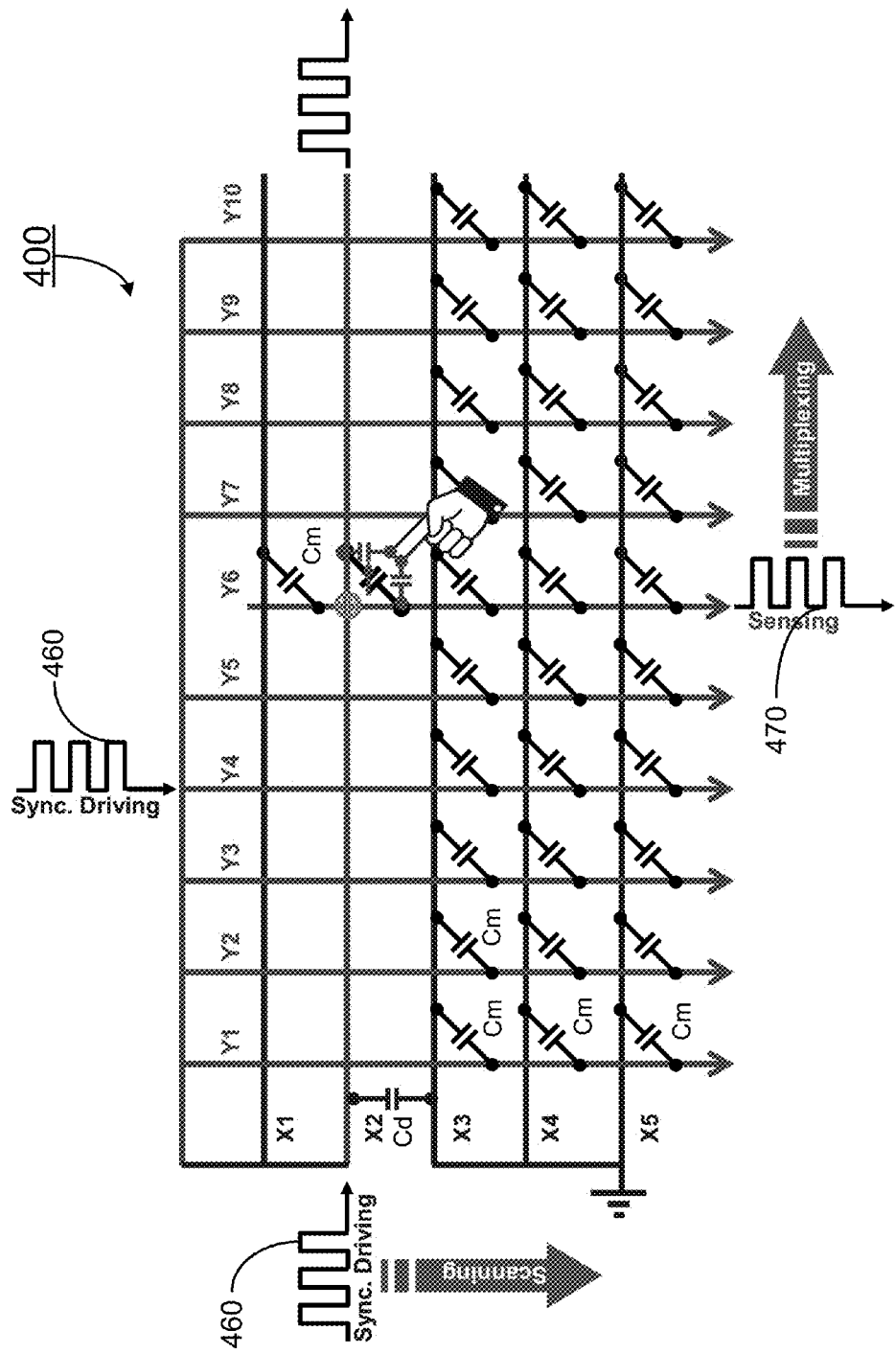
FIG. 4 shows schematically an effective circuit diagram of a capacitive touch panel according to another embodiment of the present invention.

Referring to FIG. 4, a capacitive touch panel 400 is shown according to another embodiment of the present invention. The capacitive touch panel 400 is similar to the capacitive touch panel 100 shown in FIG. 2, except that a pair of driving electrodes, e.g., X1 and X2, and some sensing electrodes, e.g., Y1-Y5 and Y7-Y10, are synchronically driven by the sync driving signal 460. The not-driven sensing electrode Y6 is used to sense and transmit a sensing signal 470. The location of the contact point is detectable by a controller that measures a change in a touch sensing signal 470 at the touch location.

According to the embodiment of the invention, each time the sync driving signal 460 synchronically drives a pair of driving electrodes, and the some sensing electrodes, and the remaining driving electrodes are grounded. The sync driving signal 460 is sequentially applied to each pair of the plurality of driving electrodes X1-X5, for example, (X1, X2), (X2, X3), (X3, X4) and (X4, X5), one by one.

Similarly, for such a driving configuration, the capacitance Cd between the pair of driving electrodes X1 and X2, and the capacitance Cm between the pair of driving electrodes X1 and X2 and the driven sensing electrodes Y1-Y5 and Y7-Y10 disappear, because of the synchronic driving. Accordingly, the capacitance associated with the pair of driving electrodes X1 and X2 is significantly reduced, particularly for a large sized touch panel.

Figure 5:
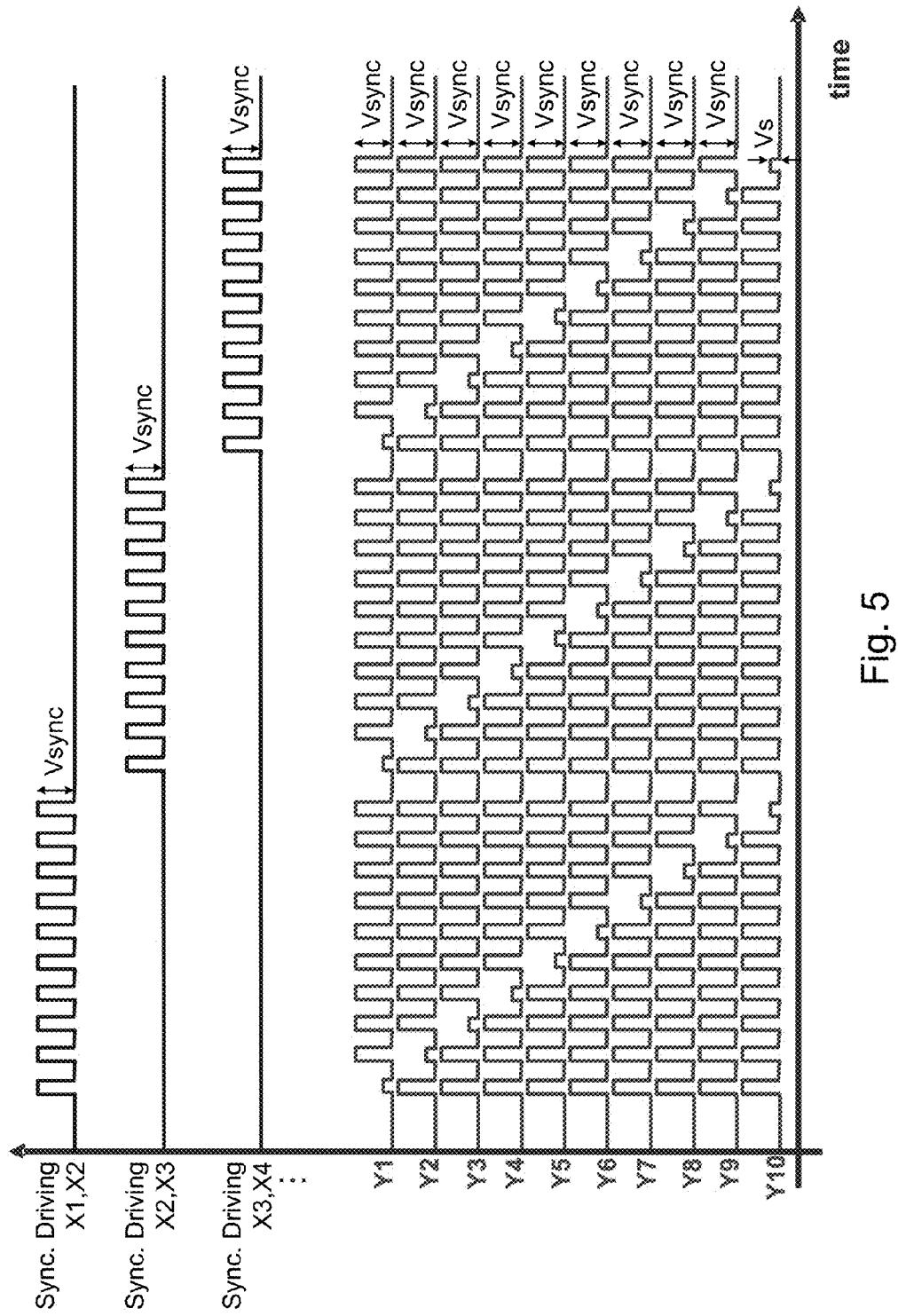
FIG. 5 shows schematically sync driving and sensing signals of the capacitive touch panel shown in FIG. 4.

FIG. 5 shows schematically the sync driving signal Vsync and the sensing signal Vs for the capacitive touch panel shown in FIG. 4. The sync driving signal Vsync is sequentially applied to each pair of driving electrodes, (X1, X2), (X2, X3), (X3, X4) and (X4, X5), one by one.

Figure 6:
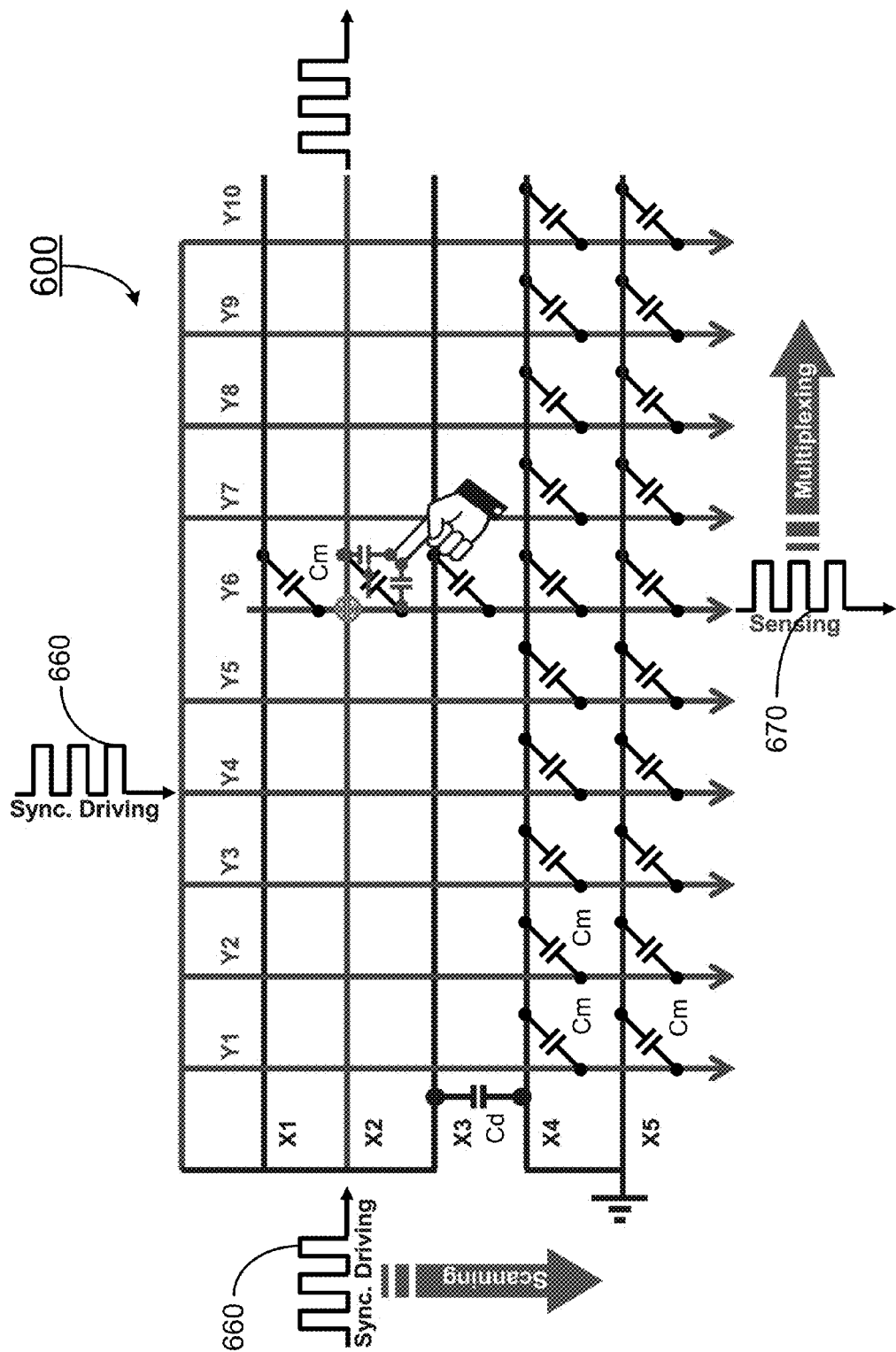
FIG. 6 shows schematically an effective circuit diagram of a capacitive touch panel according to yet another embodiment of the present invention.

Referring to FIG. 6, a capacitive touch panel 600 is shown according to yet another embodiment of the present invention. The capacitive touch panel 600 is similar to the capacitive touch panel 100 shown in FIG. 2, except that a group of three driving electrodes, e.g., X1-X3, are synchronically driven by the sync driving signal 660 each time. The remaining driving electrodes are grounded. One or more sensing electrodes, for example, Y6 in the embodiment, are used to sense a touch, while the remaining sensing electrodes, e.g., Y1-Y5 and Y7-Y10, are also synchronically driven by the sync driving signal 660. The not-driven sensing electrode Y6 transmits a sensing signal 670. The location of the contact point is detectable by a controller that measures a change in a touch sensing signal 670 at the touch location.

According to the embodiment of the invention, each time the sync driving signal 660 synchronically drives a group of three driving electrodes, and the sensing electrodes on which no transmits a sensing signal 670. The remaining driving electrodes are grounded. The not-driven sensing electrode transmits a sensing signal 670. Further, the sync driving signal 660 is sequentially applied to each group of three driving electrodes, for example, (X1, X2, X3), (X2, X3, X4) and (X3, X4, X5), one by one. Because of the synchronic driving, the capacitance Cd between the group of three driving electrodes X1-X3, and the capacitance Cm between the group of three driving electrodes X1-X3 and the driven sensing electrodes Y1-Y5 and Y7-Y10 disappear. Accordingly, the capacitance associated with the group of three driving electrodes X1-X3 is significantly reduced, particularly for a large sized touch panel.

Figure 7:
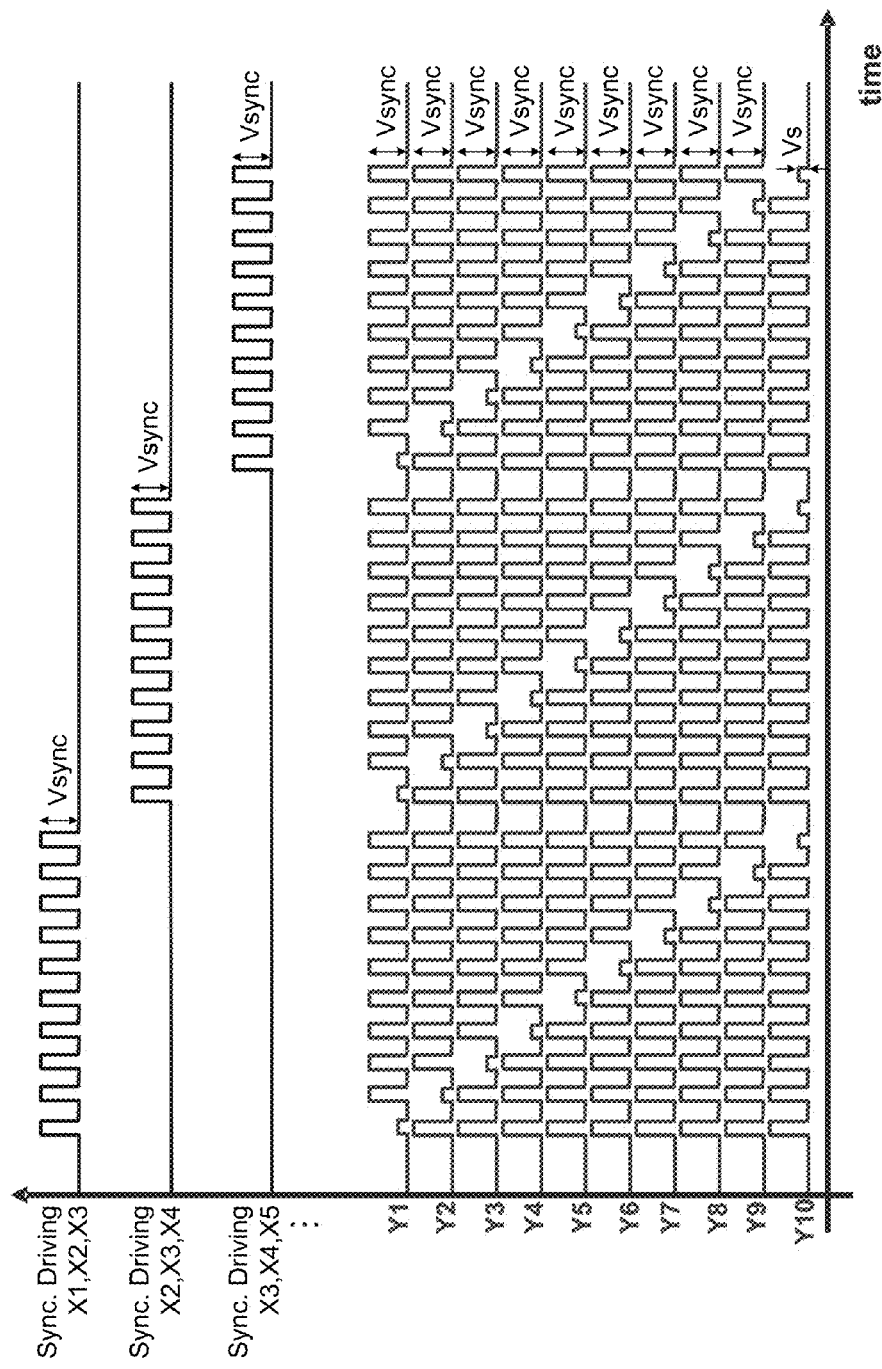
FIG. 7 shows schematically sync driving and sensing signals of the capacitive touch panel shown in FIG. 6.

FIG. 7 shows schematically the sync driving signal Vsync and the sensing signal Vs for the capacitive touch panel shown in FIG. 6. The sync driving signal Vsync is sequentially applied to each group of three driving electrodes of the plurality of driving electrodes, for example, (X1, X2, X3), (X2, X3, X4) and (X3, X4, X5), one by one.

Figure 8:
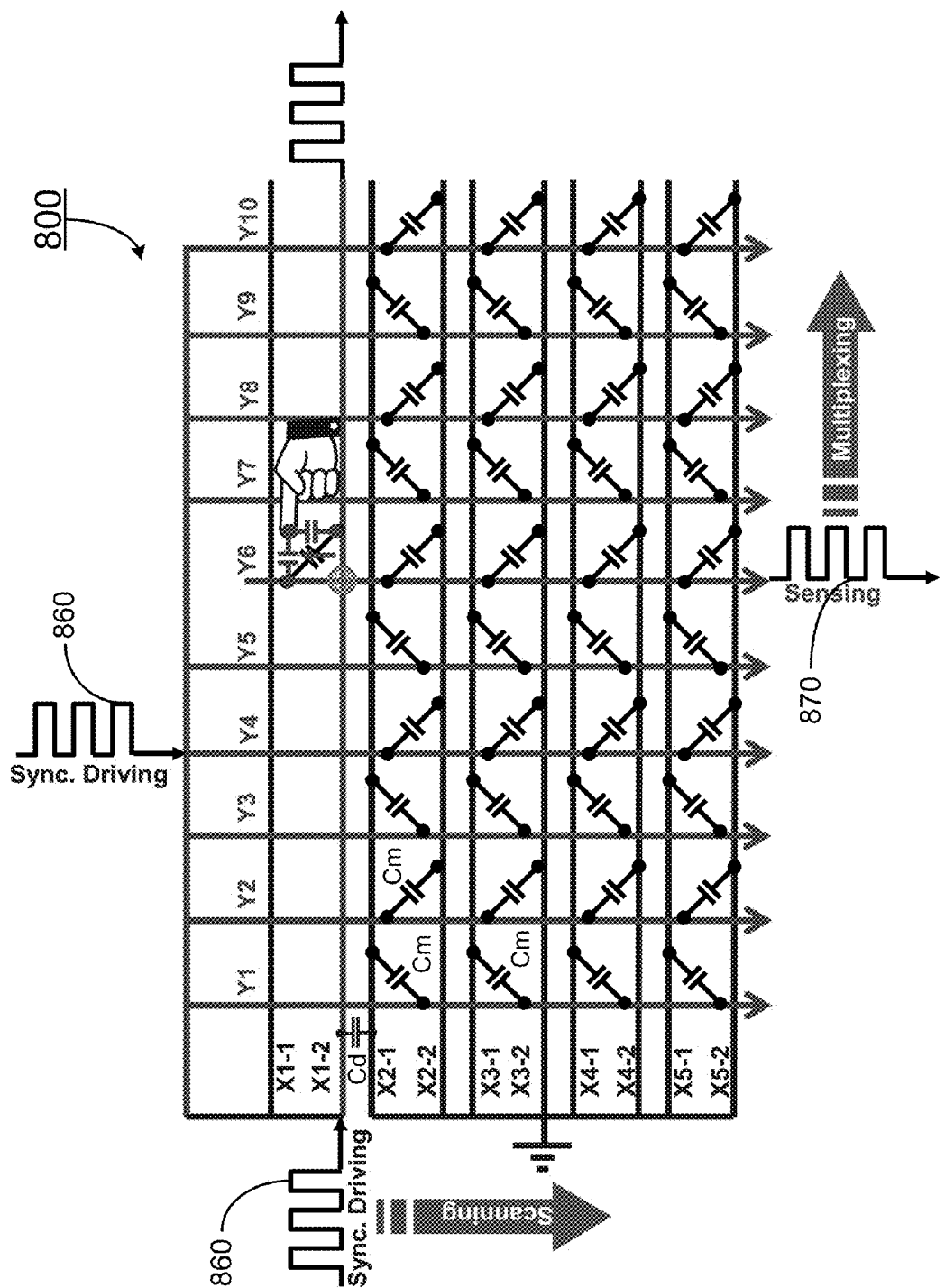
FIG. 8 shows schematically an effective circuit diagram of a capacitive touch panel according to one embodiment of the present invention.

Referring to FIG. 8, a capacitive touch panel 800 is shown according to yet another embodiment of the present invention. The capacitive touch panel 800 is a multi-channel type touch panel, where each electrode row includes a first driving electrode Xi-1 and a second driving electrode Xi-2, where i=1, 2, . . . , N. For example, the first driving electrode Xi-1 includes the odd driving electrodes of the electrode row, while the second driving electrode Xi-2 includes the even driving electrodes of the electrode row. Similar to the capacitive touch panel 400 shown in FIG. 4, a pair of driving electrodes is synchronically driven by the sync driving signal 860 each time. The remaining driving electrodes are grounded. One or more sensing electrodes, for example, Y6 in the embodiment, are used to sense a touch, while the remaining sensing electrodes, e.g., Y1-Y5 and Y7-Y10, are also synchronically driven by the sync driving signal 860. The not-driven sensing electrode Y6 transmits a sensing signal 870. The location of the contact point is detectable by a controller that measures a change in a touch sensing signal 870 at the touch location.

Further, the sync driving signal 860 is sequentially applied to each pair of the driving electrodes, for example, (X1-1, X1-2), (X1-2, X2-1), (X2-1, X2-2), (X2-2, X3-1), . . . , and (X5-1, X5-2), one by one. Because of the synchronic driving, the capacitance Cd between the pair of driving electrodes, and the capacitance Cm between the pair of driving electrodes and the driven sensing electrodes Y1-Y5 and Y7-Y10 disappear. Accordingly, the capacitance associated with the pair of driving electrodes is significantly reduced, particularly for a large sized touch panel.

Figure 9:
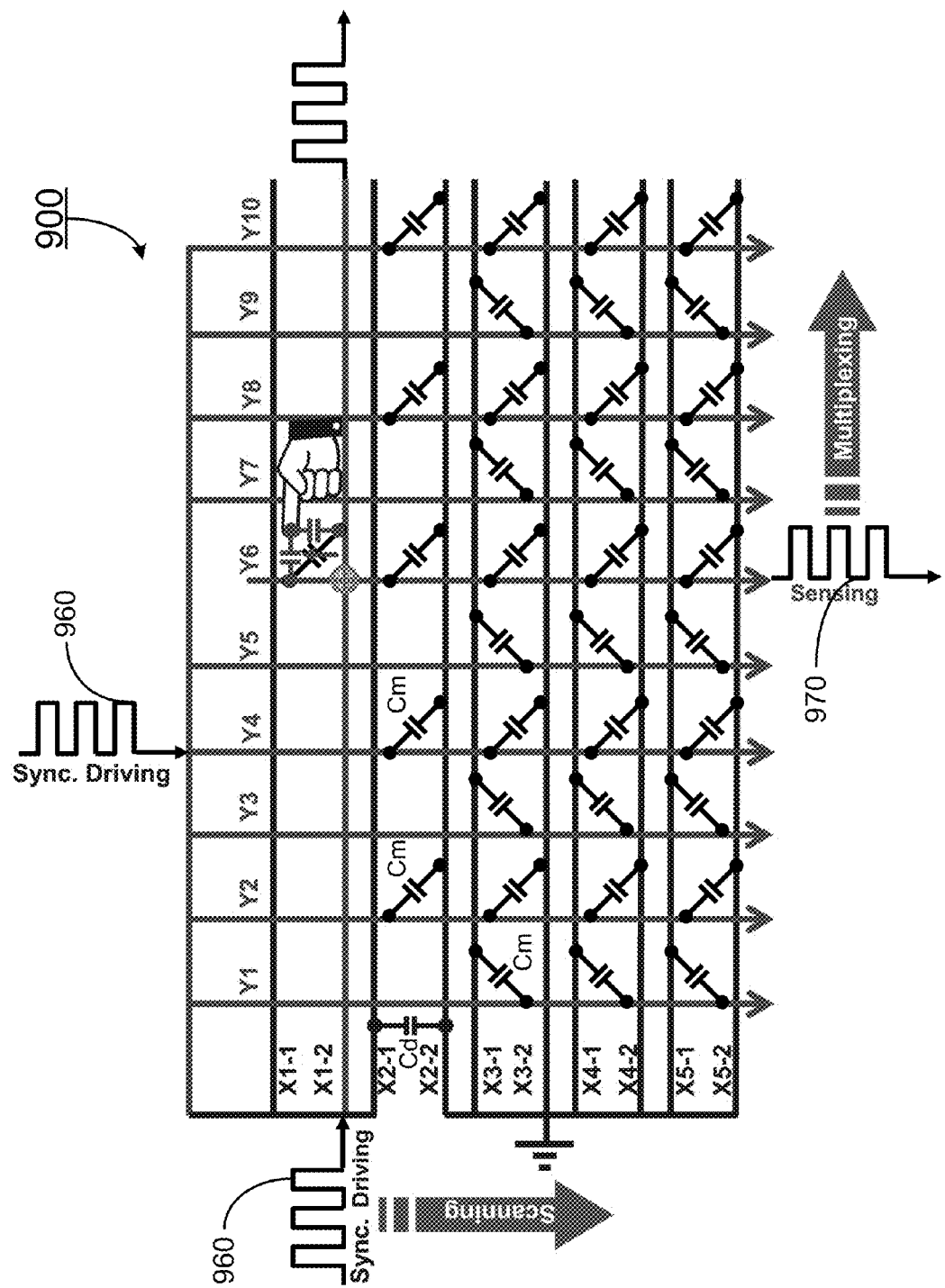
FIG. 9 shows schematically an effective circuit diagram of a capacitive touch panel according to another embodiment of the present invention.

FIG. 9 shows a capacitive touch panel 900 according to one embodiment of the present invention. The capacitive touch panel 900 is structurally same as the capacitive touch panel 800 shown in FIG. 8. However, each time, a group of three driving electrodes is synchronically driven by the sync driving signal 960. The remaining driving electrodes are grounded. One or more sensing electrodes, for example, Y6 in the embodiment, are used to sense a touch, while the remaining sensing electrodes, e.g., Y1-Y5 and Y7-Y10, are also synchronically driven by the sync driving signal 960. The not-driven sensing electrode Y6 transmits a sensing signal 970. The location of the contact point is detectable by a controller that measures a change in a touch sensing signal 970 at the touch location.

Further, the sync driving signal 960 is sequentially applied to each pair of the driving electrodes, for example, (X1-1, X1-2, X2-1), (X1-2, X2-1, X2-2), (X2-1, X2-2, X3-1), . . . , and (X4-2, X5-1, X5-2), one by one. Because of the synchronic driving, the capacitance Cd between the group of three driving electrodes, and the capacitance Cm between the group of three driving electrodes and the driven sensing electrodes Y1-Y5 and Y7-Y10 disappear. Accordingly, the capacitance associated with the group of three driving electrodes is significantly reduced, particularly for a large sized touch panel.

Figure 10:
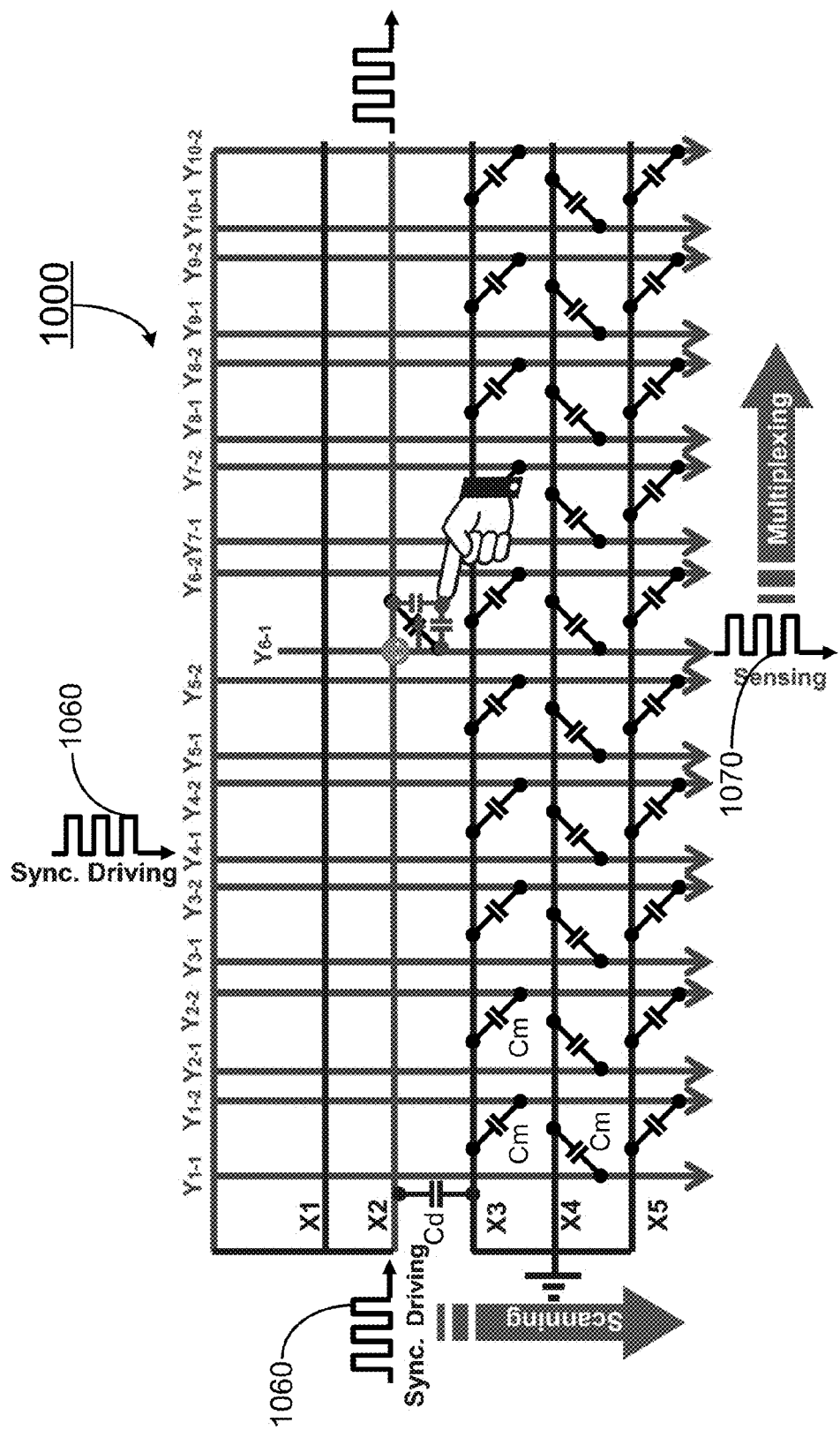
FIG. 10 shows schematically an effective circuit diagram of a capacitive touch panel according to yet another embodiment of the present invention.

FIG. 10 shows another embodiment of a capacitive touch panel 1000 according to the present invention. The capacitive touch panel 1000 is also a multi-channel type touch panel, where each of the driving electrodes is a single channel type driving electrode, while each of the sensing electrodes is a two channel type sensing electrode, i.e., each electrode column includes a first sensing electrode Yk-1 and a second sensing electrode Yk-2, where k=1, 2, . . . , M. For example, the first sensing electrode Yk-1 includes the odd sensors of the electrode column, while the second sensing electrode Yk-2 includes the even sensors of the electrode column. Similar to the capacitive touch panel 400 shown in FIG. 4, a pair of driving electrodes is synchronically driven by the sync driving signal 1060 each time. The remaining driving electrodes are grounded. One or more sensing electrodes, for example, Y6-1 in the embodiment, are used to sense a touch, while the remaining sensing electrodes, e.g., Y1-1 to Y5-2 and Y6-2 to Y10-2, are also synchronically driven by the sync driving signal 1060. The not-driven sensing electrode Y6-1 transmits a sensing signal 1070. The location of the contact point is detectable by a controller that measures a change in a touch sensing signal 1070 at the touch location.

Further, the sync driving signal 1060 is sequentially applied to each pair of the driving electrodes, for example, (X1, X2), (X2, X3), (X3, X4), and (X4, X5), one by one. Because of the synchronic driving, the capacitance Cd between the pair of driving electrodes, and the capacitance Cm between the pair of driving electrodes and the driven sensing electrodes Y1-1 to Y5-2 and Y6-2 to Y10-2 disappear. Accordingly, the capacitance associated with the pair of driving electrodes is significantly reduced, particularly for a large sized touch panel.

Figure 11:
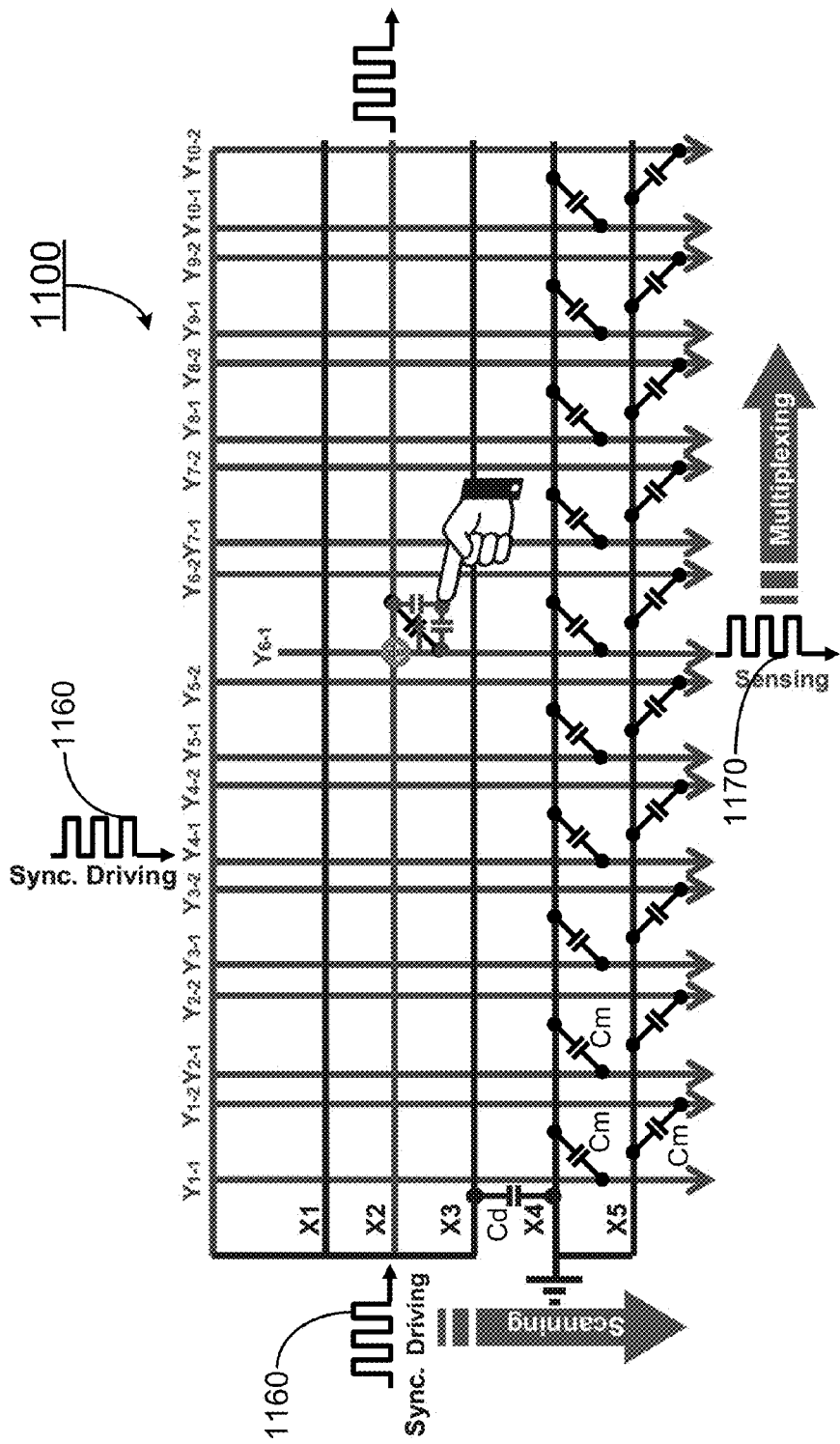
FIG. 11 shows schematically an effective circuit diagram of a capacitive touch panel according to an alternative embodiment of the present invention.
Figure 12:
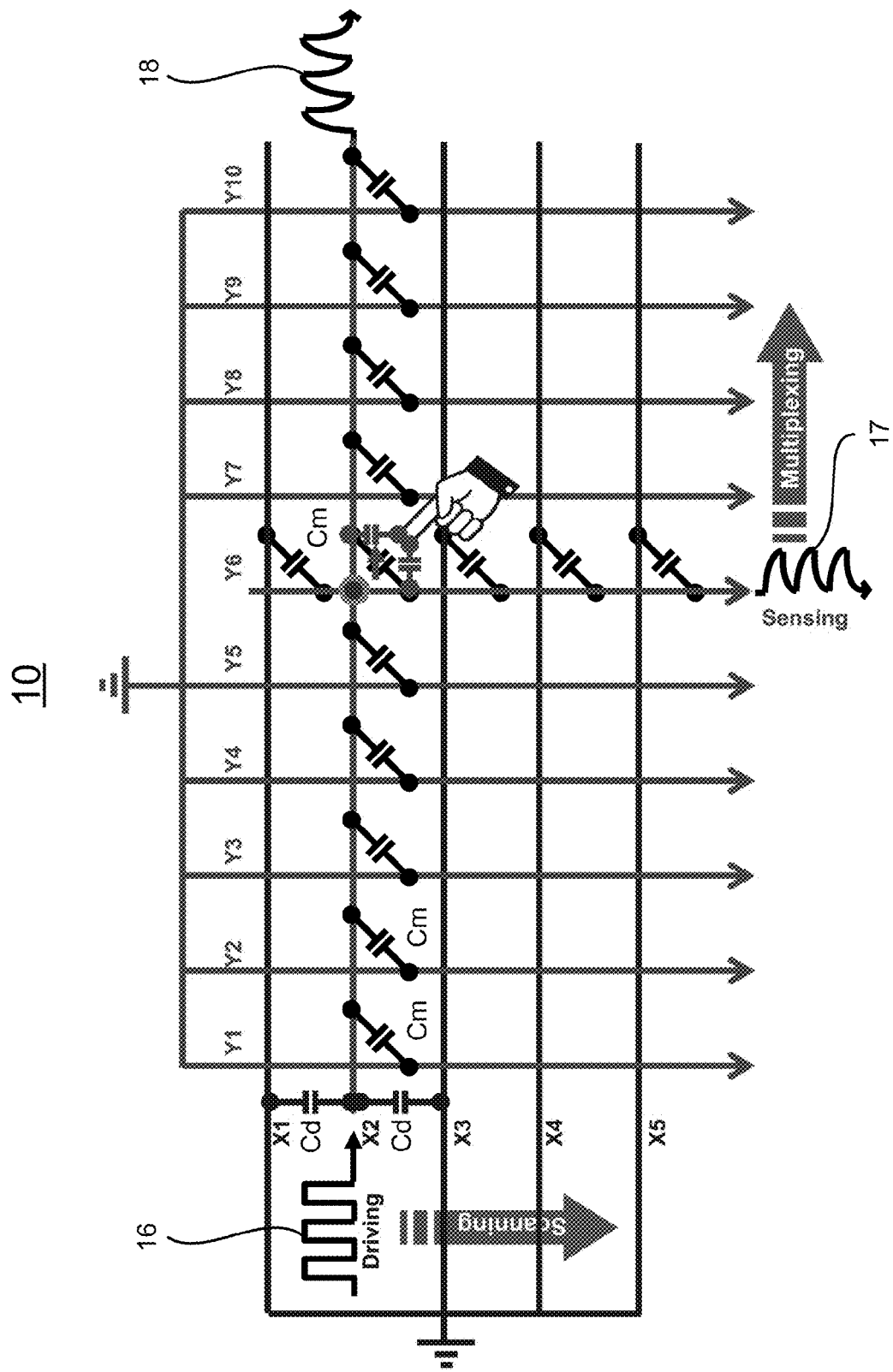
FIG. 12 shows schematically an effective circuit diagram of a conventional touch panel.

FIG. 11 shows yet another embodiment of a capacitive touch panel 1100 according to the present invention. The capacitive touch panel 1100 is structurally same as the capacitive touch panel 1000 shown in FIG. 10. However, each time, a group of three driving electrodes is synchronically driven by the sync driving signal 1160. The remaining driving electrodes are grounded. One or more sensing electrodes, for example, Y6-1 in the embodiment, are used to sense a touch, while the remaining sensing electrodes, e.g., Y1-1 to Y5-2 and Y6-2 to Y10-2, are also synchronically driven by the sync driving signal 1160. The not-driven sensing electrode Y6-1 transmits a sensing signal 1170. The location of the contact point is detectable by a controller that measures a change in a touch sensing signal 1170 at the touch location.

Further, the sync driving signal 1160 is sequentially applied to each group of three driving electrodes, for example, (X1, X2, X3), (X2, X3, X4), and (X3, X4, X5), one by one. Because of the synchronic driving, the capacitance Cd between the pair of driving electrodes, and the capacitance Cm between the pair of driving electrodes and the driven sensing electrodes Y1-1 to Y5-2 and Y6-2 to Y10-2 disappear. Accordingly, the capacitance associated with the pair of driving electrodes is significantly reduced, particularly for a large sized touch panel.

As disclosed above, various embodiments of the capacitive touch panel having five (5) driving electrodes X1-X5 and ten (10) sensing electrodes Y1-Y10 are illustrated according to different driving configurations. People skilled in the art would be appreciated that other numbers of driving electrodes and sensing electrodes can also be utilized to practice the invention. Generally, according to the present invention, the capacitive touch panel has a plurality of driving electrodes, $\{X_n\}$, n=1, 2, ..., N, spatially arranged along a row direction, a plurality of sensing electrodes, $\{Y_m\}$, m=1, 2, ..., M, spatially arranged crossing over the plurality of driving electrodes $\{X_n\}$ along a column direction perpendicular to the row direction such that the plurality of driving electrodes $\{X_n\}$ and the plurality of sensing electrodes $\{Y_m\}$ define a touch sensor matrix having N rows and M columns, each of N and M being a positive integer, and a driver electrically coupled to the touch sensor matrix and configured to generate a driving signal to synchronically drive a group of driving electrodes of the plurality of driving electrodes $\{X_n\}$ and (M-j) sensing electrodes of the plurality of sensing electrodes $\{Y_m\}$, wherein j=1, 2, 3, ..., or M-1, such that at least one sensing electrode is not driven by the driving signal, and wherein the remaining driving electrodes of the plurality of driving electrodes $\{X_n\}$ are grounded. The group of the plurality of driving electrodes $\{X_n\}$ has $N_E$ driving electrodes, wherein $N_E$ is an integer that is greater than one and less than N. The plurality of driving electrodes $\{X_n\}$ has $N_G$ groups, wherein $N_G=(N-N_E+1)$. The driving signal is sequentially applied to each group of the plurality of driving electrodes $\{X_n\}$ to drive them synchronically. The at least one sensing electrode transmits a sensing signal of a touch.

One aspect of the present invention provides a method of driving such a capacitive touch panel. In one embodiment, the method includes the steps of synchronically driving a group of driving electrodes of the plurality of driving electrodes $\{X_n\}$ and (M-j) sensing electrodes of the plurality of sensing electrodes $\{Y_m\}$ with a driving signal, wherein j=1, 2, 3, ..., or M-1, such that at least one sensing electrode is not driven by the driving signal, and grounding the remaining driving electrodes of the plurality of driving electrodes $\{X_n\}$. The method further includes the step of sequentially applying the driving signal to each group of the plurality of driving electrodes $\{X_n\}$ to drive them synchronically. The method may also include the step of detecting a sensing signal of a touch transmitted from the at least one sensing electrode.

Briefly, the present invention, among other things, recites a capacitive touch panel configured such that one or more driving electrodes and the sensing electrodes are synchronically driven by a sync driving signal each time, such that at least one sensing electrode is not driven by the driving signal, while the remaining driving electrodes are grounded. As such, the RC loading of driving electrodes and/or sensing electrodes can be significantly reduced.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A capacitive touch panel, comprising:
    a plurality of driving electrodes, $\{X_n\}$, n=1, 2, ..., N, spatially arranged along a row direction;
    a plurality of sensing electrodes, $\{Y_m\}$, m=1, 2, ..., M, spatially arranged crossing over the plurality of driving electrodes $\{X_n\}$ along a column direction perpendicular to the row direction, such that the plurality of driving electrodes $\{X_n\}$ and the plurality of sensing electrodes $\{Y_m\}$ define a touch sensor matrix having N rows and M columns, each of N and M being a positive integer; and
    a driver electrically coupled to the touch sensor matrix and configured to generate a driving signal to synchronically drive both one of the plurality of driving electrodes $\{X_n\}$ and (M-j) sensing electrodes of the plurality of sensing electrodes $\{Y_m\}$, wherein j=1, 2, 3, ..., or M-1, wherein j sensing electrodes are not driven by the driving signal and are adapted to transmit a sensing signal of a touch, and wherein the remaining driving electrodes of the plurality of driving electrodes $\{X_n\}$ are grounded.

2. The capacitive touch panel of claim 1, wherein the driving signal is sequentially applied to each of the remaining driving electrodes of the plurality of driving electrodes $\{X_n\}$.

3. The capacitive touch panel of claim 1, wherein each of the plurality of sensing electrodes and the plurality of driving electrodes are electrically insulated from one another.

4. A method of driving a capacitive touch panel comprising a plurality of driving electrodes, $\{X_n\}$, n=1, 2, ..., N, spatially arranged along a row direction, and a plurality of sensing electrodes, $\{Y_m\}$, m=1, 2, ..., M, spatially arranged crossing over the plurality of driving electrodes $\{X_n\}$ along a column direction perpendicular to the row direction such that the plurality of driving electrodes $\{X_n\}$ and the plurality of sensing electrodes $\{Y_m\}$ define a touch sensor matrix having N rows and M columns, each of N and M being a positive integer, the method comprising the steps of:
    synchronically driving both one of the plurality of driving electrodes $\{X_n\}$ and (M-j) sensing electrodes of the plurality of sensing electrodes $\{Y_m\}$ with a driving signal, wherein j=1, 2, 3, ..., or M-1, wherein j sensing electrodes are not driven by the driving signal and are adapted to transmit a sensing signal of a touch;
    grounding the remaining driving electrodes of the plurality of driving electrodes $\{X_n\}$.

5. The method of claim 4, further comprising the step of sequentially applying the driving signal to each of the remaining driving electrodes of the plurality of driving electrodes $\{X_n\}$.

6. The method of claim 5, further comprising the step of detecting the sensing signal of the touch transmitted from the j sensing electrodes.

7. A capacitive touch panel, comprising:
    a plurality of driving electrodes, $\{X_n\}$, n=1, 2, ..., N, spatially arranged along a row direction;
    a plurality of sensing electrodes, $\{Y_m\}$, m=1, 2, ..., M, spatially arranged crossing over the plurality of driving electrodes $\{X_n\}$ along a column direction perpendicular to the row direction such that the plurality of driving electrodes $\{X_n\}$ and the plurality of sensing electrodes $\{Y_m\}$ define a touch sensor matrix having N rows and M columns, each of N and M being a positive integer; and
    a driver electrically coupled to the touch sensor matrix and configured to generate a driving signal to synchronically drive both a group of driving electrodes of the plurality of driving electrodes $\{X_n\}$ and (M-j) sensing electrodes of the plurality of sensing electrodes $\{Y_m\}$, wherein j=1, 2, 3, ..., or M-1, wherein j sensing electrodes are not driven by the driving signal and are adapted to transmit a sensing signal of a touch, and wherein the remaining driving electrodes of the plurality of driving electrodes $\{X_n\}$ are grounded.

8. The capacitive touch panel of claim 7, wherein the group of the plurality of driving electrodes $\{X_n\}$ has $N_E$ driving electrodes, wherein $N_E$ is an integer that is greater than one and less than N.

9. The capacitive touch panel of claim 8, wherein the plurality of driving electrodes $\{X_n\}$ has $N_G$ groups, wherein $N_G=(N-N_E+1)$.

10. The capacitive touch panel of claim 9, wherein the driving signal is sequentially applied to each group of the plurality of driving electrodes $\{X_n\}$ to drive them synchronically.

11. The capacitive touch panel of claim 7, wherein each of the plurality of sensing electrodes and the plurality of driving electrodes are electrically insulated from one another.

12. A method of driving a capacitive touch panel comprising a plurality of driving electrodes, $\{X_n\}$, $n=1, 2, \ldots, N$, spatially arranged along a row direction, and a plurality of sensing electrodes, $\{Y_m\}$, $m=1, 2, \ldots, M$, spatially arranged crossing over the plurality of driving electrodes $\{X_n\}$ along a column direction perpendicular to the row direction such that the plurality of driving electrodes $\{X_n\}$ and the plurality of sensing electrodes $\{Y_m\}$ define a touch sensor matrix having N rows and M columns, each of N and M being a positive integer, the method comprising the steps of:

synchronically driving both a group of driving electrodes of the plurality of driving electrodes $\{X_n\}$ and (M-j) sensing electrodes of the plurality of sensing electrodes $\{Y_m\}$ with a driving signal, wherein $j=1, 2, 3, \ldots$, or M-1, wherein j sensing electrodes are not driven by the driving signal and are adapted to transmit a sensing signal of a touch; and grounding the remaining driving electrodes of the plurality of driving electrodes $\{X_n\}$.

13. The method of claim 12, wherein the group of the plurality of driving electrodes $\{X_n\}$ has $N_E$ driving electrodes, wherein $N_E$ is an integer that is greater than one and less than N.

14. The method of claim 13, wherein the plurality of driving electrodes $\{X_n\}$ has $N_G$ groups, wherein $N_G=(N-N_E+1)$.

15. The method of claim 14, further comprising the step of sequentially applying the driving signal to each group of the plurality of driving electrodes $\{X_n\}$ to drive them synchronically.

16. The method of claim 15, further comprising the step of detecting the sensing signal of the touch transmitted from the j sensing electrodes.

* * * * *